(12) United States Patent
Rice (10) Patent No.: US 11,333,190 B1
(45) Date of Patent: May 17, 2022

(54) BALLISTIC RESISTANT PANEL INSERT ASSEMBLY

(71) Applicant: Donald Wayne Rice, Ripley, NY (US)

(72) Inventor: Donald Wayne Rice, Ripley, NY (US)

(73) Assignee: SKY CLIMBER FASTENERS LLC, Delaware, OH (US)

( * ) Notice: Subject to any disclaimer, the term of this patent is extended or adjusted under 35 U.S.C. 154(b) by 0 days.

(21) Appl. No.: 15/717,235

(22) Filed: Sep. 27, 2017

(51) Int. Cl.
*F16B 37/12* (2006.01)
*F16B 5/02* (2006.01)
*F16B 5/01* (2006.01)
*F16B 13/14* (2006.01)

(52) U.S. Cl.
CPC ............ *F16B 37/12* (2013.01); *F16B 5/0208* (2013.01); *F16B 5/01* (2013.01); *F16B 13/141* (2013.01)

(58) Field of Classification Search
CPC .......... F16B 5/01; F16B 13/141; F16B 37/12; F16B 5/0208
USPC .................................................. 411/82, 82.1
See application file for complete search history.

(56) References Cited

U.S. PATENT DOCUMENTS

| | | | |
|---|---|---|---|
| 1,787,114 A | 12/1930 | Lelean et al. | |
| 2,365,433 A | 12/1944 | Polizzi | |
| 3,129,742 A | 4/1964 | Faroni et al. | |
| 4,854,086 A * | 8/1989 | Kubsh | B24D 7/16 451/550 |
| 5,080,544 A | 1/1992 | Bruyere | |
| 5,360,303 A | 11/1994 | Behrens et al. | |
| 6,494,659 B1 | 12/2002 | Lutkus et al. | |
| 6,726,422 B2 | 4/2004 | Giannakakos | |
| 6,854,921 B2 * | 2/2005 | Melberg | F16B 33/002 109/49.5 |
| 7,195,436 B1 * | 3/2007 | Stephen | F16B 5/01 411/373 |
| 8,297,169 B2 * | 10/2012 | Kunda | F16B 5/025 89/36.11 |
| 8,721,243 B2 * | 5/2014 | Zimmer | F16B 5/01 411/80.1 |
| 9,845,822 B2 | 12/2017 | Pailhories | |
| 10,197,078 B2 * | 2/2019 | Richardson | F16B 37/122 |
| 10,962,334 B2 * | 3/2021 | Ahrens | G08C 21/00 |
| 2004/0120789 A1 | 6/2004 | Masuda | |
| 2008/0008558 A1 * | 1/2008 | Costabel | F16B 37/12 411/438 |
| 2009/0047502 A1 * | 2/2009 | Folaron | B82Y 30/00 428/327 |
| 2014/0287641 A1 * | 9/2014 | Steiner, III | F41H 5/0442 442/223 |
| 2020/0130842 A1 * | 4/2020 | Young | B64D 11/02 |

* cited by examiner

Primary Examiner — Flemming Saether
(74) Attorney, Agent, or Firm — Dawsey Co., LPA; David J. Dawsey (57) ABSTRACT

A ballistic resistant fastener having a ballistic resistant face plate includes a plurality of layers of aramid synthetic fibers or carbon nanotubes, a plug body having a threaded body bore extending into the body, a helical thread insert within the plug body, a bolt engaging the helical thread insert, and a bottom cup having a cup sidewall attached to the body.

12 Claims, 7 Drawing Sheets

BALLISTIC RESISTANT PANEL INSERT ASSEMBLY

CROSS-REFERENCE TO RELATED APPLICATIONS

This application claims priority to U.S. Provisional Patent Application Ser. No. 62/400,562, and U.S. Provisional Patent Application Ser. No. 62/400,554, both filed Sep. 27, 2016, and also to U.S. patent application Ser. No. 15/595,620 filed May 13, 2017, which claims priority to U.S. Provisional Patent Application Ser. No. 62/335,915, filed May 13, 2016, the disclosures of which are incorporated by reference.

STATEMENT REGARDING FEDERAL GRANTS

Not Applicable.

BACKGROUND OF THE INVENTION

The present disclosure relates to a ballistic-resistant panel insert and fastener system for attaching components to a panel, such as a honeycomb panel, or other structural member of an aircraft. In a preferred embodiment, the component is attached to a panel that is a honeycomb wall or door panel used in aircraft manufacture.

Honeycomb panels are widely used in the manufacture of lightweight partition systems, in particular the walls, ceilings and floors of commercial aircraft. Such panels typically have two sheets serving as outer skins of the panel, and sandwiched inside is a crosswise support system, such as a series of hexagonal cells or the like. The skins are affixed to the inner cross support to form a generally rigid panel that can be used to form enclosures. Void-core panels (of which a honeycomb core aspect is one type) are widely used in aircraft, as they form a lightweight and structurally sound panel that can be made to conform to a curved shape. By varying the type of skin on the panels, such void core panels can be readily adapted to form floors, internal partitions and the like. For example, Hexcel Corporation of Burlington, Wash., USA markets FIBRELAM™ honeycomb sandwich panels for use in aircraft flooring. See also U.S. Patent Publication US 20090072086 A1.

Existing panel attachment systems utilize a variety of structures, but in general major OEM are unsatisfied with both the price and performance of those fasteners. When installing components onto the surface of a void-core panel a panel insert is typically inserted into a hole drilled into the void-core panel. Such an insert can be either an insert that allows a threaded fastener, i.e. a bolt, to pass through the panel (a through insert), or the insert may not pass entirely though the panel (a floating insert).

Existing inserts are produced, for example by Marketing Masters of Issaquah, Wash. USA.

When utilizing floating inserts, currently the inserts are permanently installed, by "potting in" the insert by flooding the voids around the potted in insert with epoxy adhesive, which when cured, secures the insert into the panel. There are number of issues that limit the ease of installation of floating inserts, primarily relating to the difficulty in potting in the insert with epoxy, and the associated waste, and mess.

An important issue with current potted in inserts is that such inserts have limited structural integrity. There exists a continued need for an insert that maximizes the structural capabilities of void-core panels.

An additional difficulty in using such inserts is the need for the bolt fasteners driven into the insert to maintain the specified torque tolerance when in use in an environment that imposes a wide range of temperatures and vibration patterns. As such a locking mechanism is considered important. Currently, the only effective locking or retaining system available for floating inserts is a collar made of resilient material, such as Dupont Vaspal™.

These current systems are generally unacceptable. Additionally, safety and security on aircraft is considered a top priority. Various federal regulations in the United States are designed to minimize the risk that any potential hijacker armed with a weapon can breach the cockpit. Airport security protocols attempt to decrease the likelihood that hijackers are able to bring weapons on board an aircraft, and firing a weapon, such as a firearm, onboard an aircraft while the aircraft is traveling through airspace, is illegal in essentially all jurisdictions. To further these security goals at least one inventor has disclosed a bullet-resistant panel for aircraft. (See U.S. Pat. No. 5,200,256.) Another has disclosed a type of bullet-proof door. (See China Patent No. CN100489439). Some bullet proof doors have been disclosed which may be used onboard an aircraft to reduce the likelihood that any hijacker can fire a projectile or ram the cockpit door and disrupt, distract, or injure the pilots; however, such designs still have limitations such as one or more weaker areas where a bullet or shrapnel that is aimed at the fasteners may then penetrate through the fasteners either which are not ballistic-resistant, or which unacceptably weaken the structure of the door. The bullet may then penetrate into the cockpit through the specific area of the door where the fasteners are connected to the structural frame. Generally, standard fasteners are installed by drilling a hole and then inserting a fastener through the hole, and the hole can be penetrated by a bullet. Additionally, a hijacker may fire a bullet at the fasteners of a bullet proof door or bullet proof panel, and even if the bullet does not penetrate into the cockpit, the force of the bullet may damage the fasteners and allow the hijacker easier access to the cockpit by prying the damaged door open or shooting repeated bullets at the point of weakness. Additionally, other panels may be used throughout the aircraft to prevent a hijacker from being able to likely damage the rest of the cabin by shooting bullets. Moreover, a force applied to the outside of a door may in some situations cause delamination of structural elements on the inside of the door (even if the projectile does not penetrate), projecting those elements with substantial force inside the cockpit.

An improved fastener system is desired by manufacturers and retrofitters to reduce the cost of current fasteners as well as increase the structural integrity of panels, and it is also desirable to enable labor savings along with improved assembly processes along with improved reliability and strength.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

Disclosed herein is a new apparatus and associated method for ballistic-resistant fasteners or ballistic-resistant shields for use with fastening components, including systems which protect fasteners used with void-core panels. In particular the ballistic resistant insert (an XPP insert) is useful for securely attaching ballistic-resistant aircraft components to honeycomb panels. Other type of structural components may be used with the inventions disclosed and described in this disclosure. Other types of fasteners in addition to the specific embodiments described herein may also be used to confer ballistic penetration resistance to fasteners and other components used with fasteners in aircraft or other types of structures.

Figure 1:
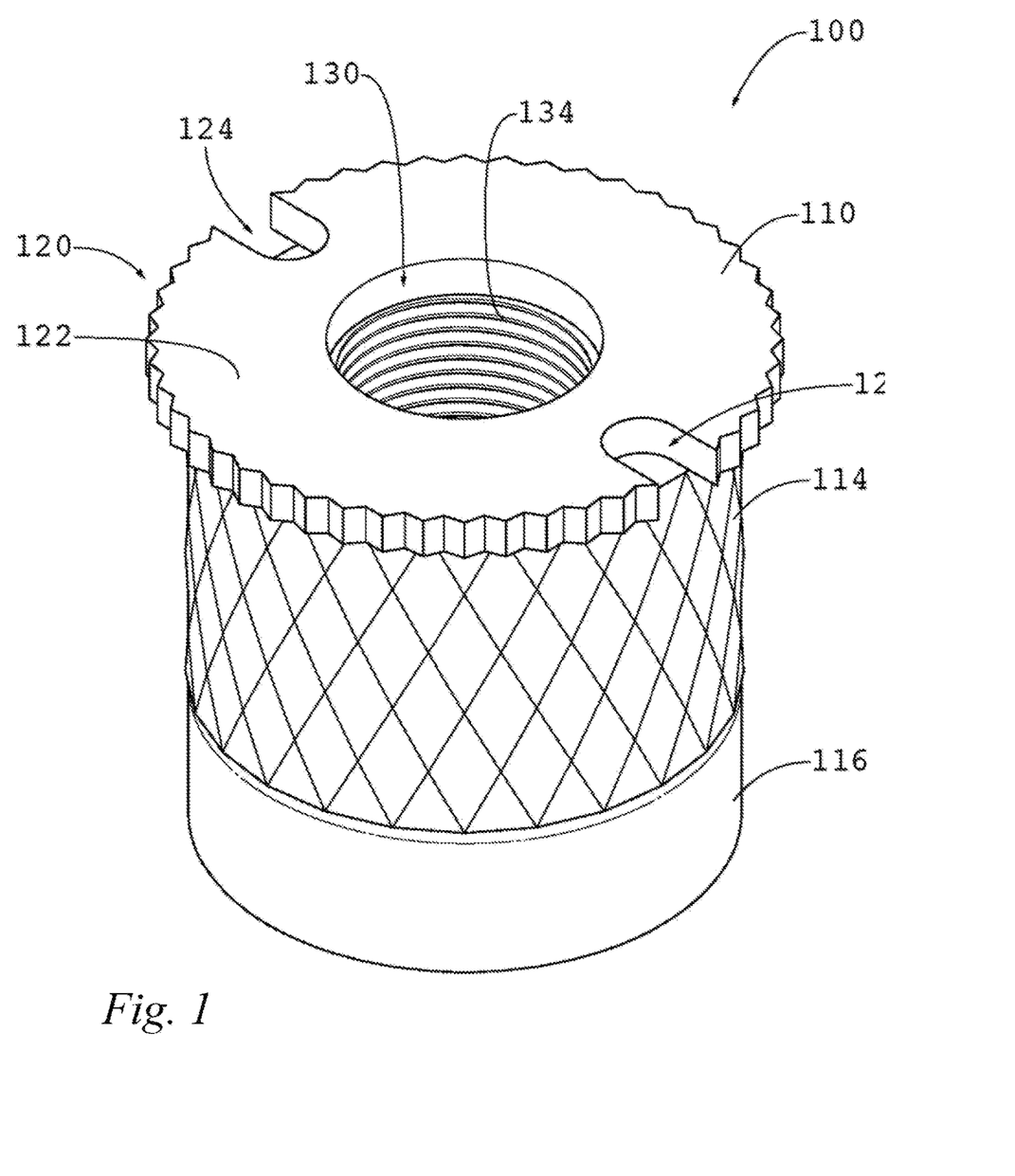
FIG. 1 shows a perspective view of the components of the insert system.

FIG. 1 shows a perspective view of the components of a panel insert system, such as can be further modified to provide ballistic resistant features. In one embodiment of the disclosure, the components of the fastener system are a face plate, a helical thread insert and a lower cup that together with the installation of a threaded bolt can retain a component to a panel. In a preferred embodiment, the fastener system is used to affix, or retain a component such as a shelf or rack to a honeycomb wall panel of an aircraft fuselage. In FIG. 1, assembly components 100 include a generally circular face plate 110, that is integrally formed with cylindrical plug body 114. Bottom cup 116 forms the interior face of the insert, and is force fit about the cylindrical body of plug body 114. Plug body 114 is in a preferred embodiment provided with diamond etching, increasing the bearing surface of the plug body.

Face plate 110, generally disk shaped, exposes surface 122, which after installation of the panel inert will be exposed to, and form the interior surface of the void-core panel. A hole 130, sized to accommodate a threaded fastener, is centrally located in surface 122, and passes through plug body 114. Helical insert 134 will bear against the threaded fastener, and when tightened, retain the bolt in the panel insert body.

Figures 2A, 2B, 2C:
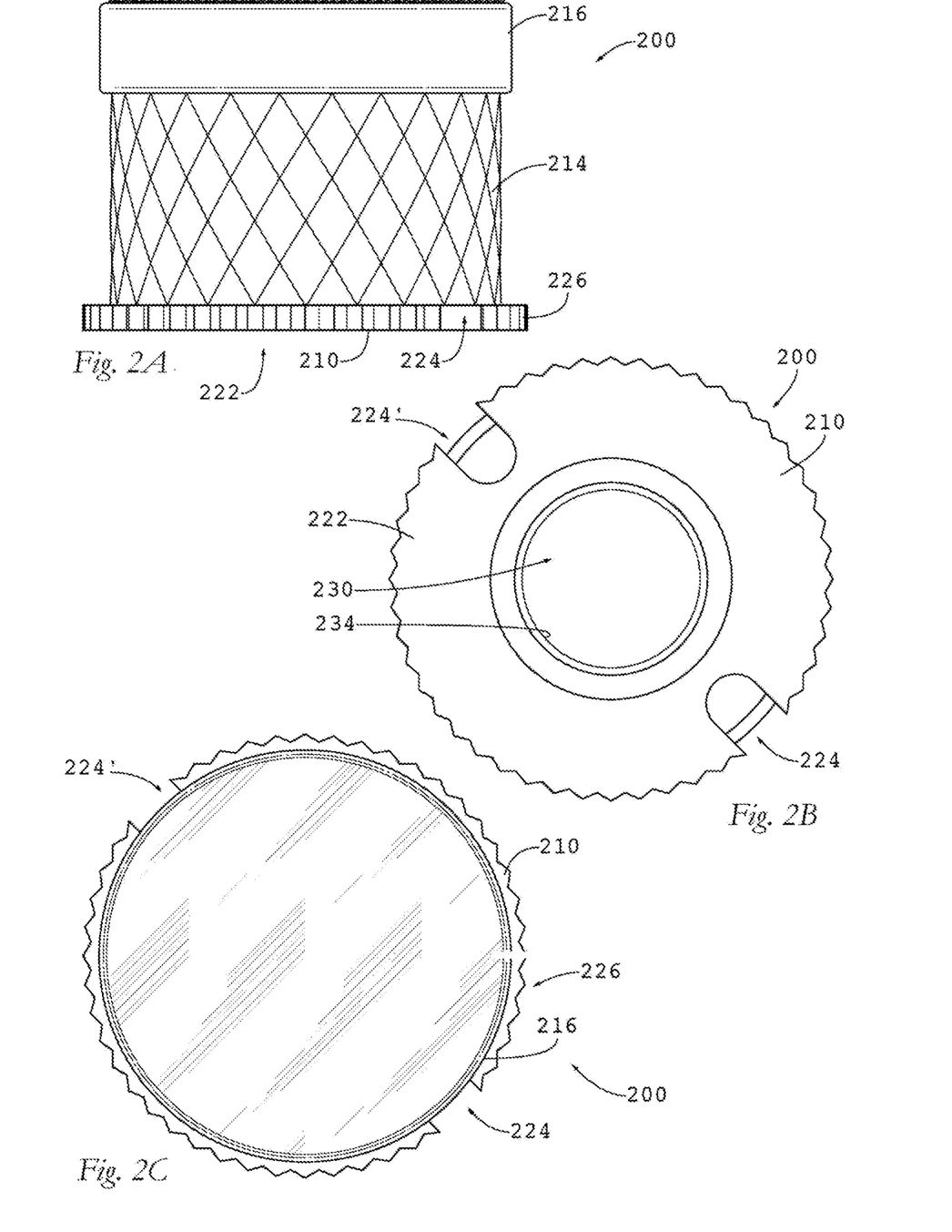
FIG. 2A shows a side elevation view of an assembled insert.
FIG. 2B shows a bottom plan view of an assembled insert.
FIG. 2C shows a top plan view of an assembled insert.

Turning now to FIG. 2, three surface views of the panel insert are shown. FIG. 2A shows a side view, FIG. 6B and face view, and FIG. 2C shows a bottom view. In FIG. 2A, the face plate disk 210 of panel insert 200 is formed as a single piece with plug body 214, with the diamond machining in the surface of plug body 214 apparent. Cup 216 is force fit over the surface of plug body 214. The serrated edge 226 and notch 224 are shown. A hole for a fastener pierces face plate surface 222. FIG. 2B shows a full surface view of face plate 210, with fastener hole 230, and helical retainer insert 234 floating inside the fastener hole. FIG. 2C shows the bottom, or inserted surface of the panel insert. Along the perimeter of face plate 210, are two or more notches 224 and 224'. The perimeter of face plate 210 is also provided with serrations 226.

Figure 3A:
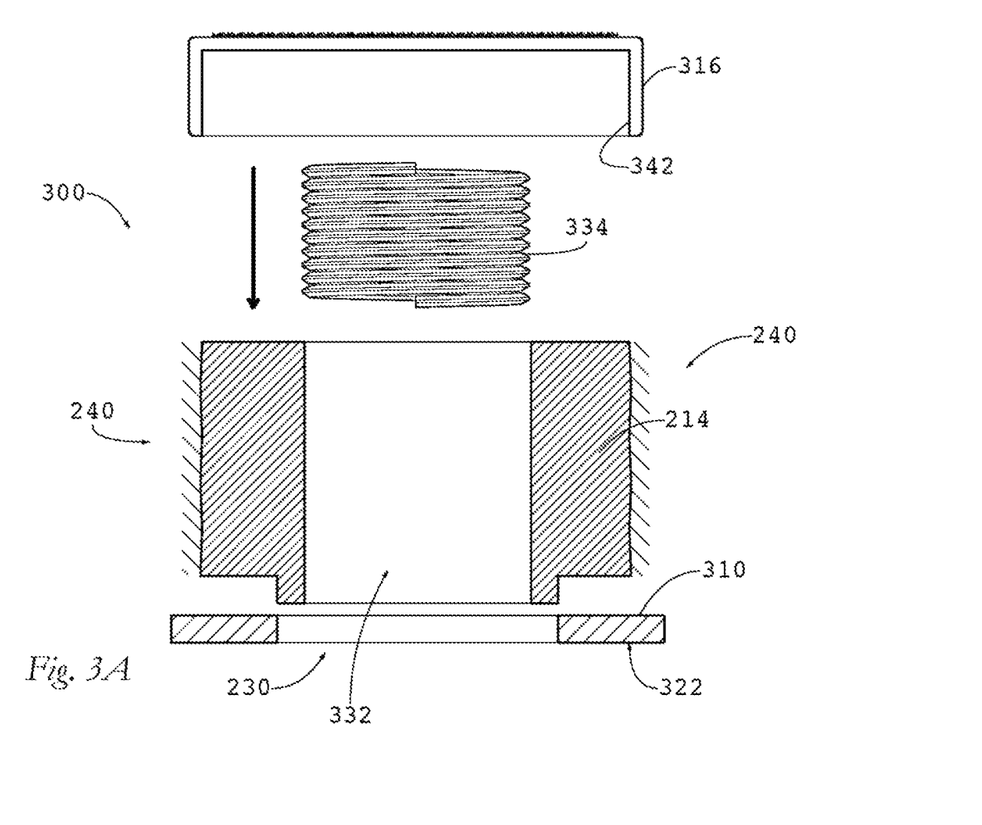
FIG. 3A shows an exploded cross-sectional assembly view of an insert.

FIG. 3 shows two cross-sectional views of the panel insert components along line 3-3 of FIG. 2. FIG. 3A is an exploded cross section. Panel insert 300 shows face plate 322, plug body 314 and cup 316. A hole 330 is formed in the face plate 322, and said opening continues into plug body at cavity 332. In a preferred embodiment the size of the hole 330 is slightly smaller that the relaxed diameter of helical insert 334, so that when the panel insert is assembled, the helical insert in trapped in cavity 332. As shown in FIG. 3A, the face plate 322 may in an alternative embodiment be formed as a separate piece from plug body 314.

Figure 3B:
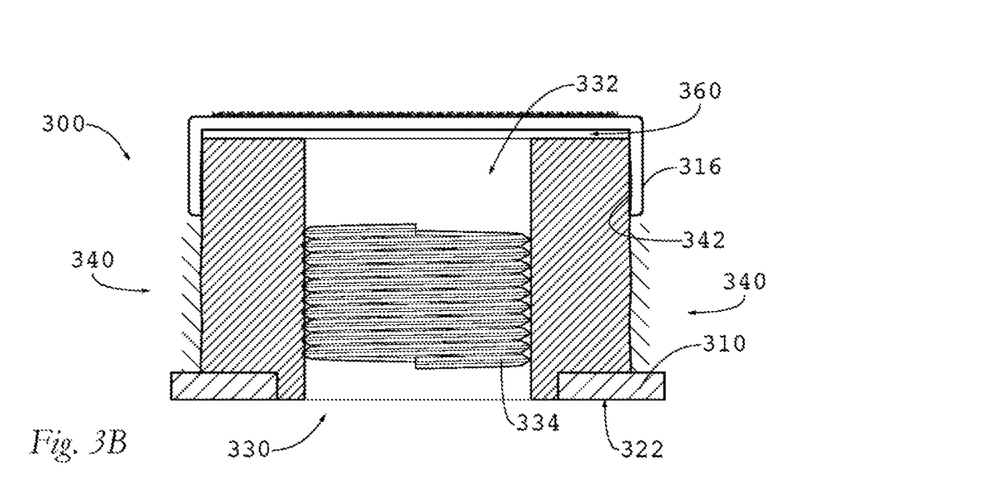
FIG. 3B shows an assembled cross-sectional view of an insert.

FIG. 38 shows a cross section with the components assembled into a panel insert. As shown panel insert 300 has face plate 322 that will be exposed on the interior surface of a mounted panel, plug body 314 and cup 316. Hole 330 in the face plate 322, continues into plug body at cavity 332, with the helical insert in trapped in cavity 332. Cup 316 is forced over the plug body 314, and may be crimped into position. The exterior surface of plug body 314 may be serrated, or diamond etched as at 340, and bear against the interior surface of the cup wall at 342. The insertion an externally threaded stud or bolt into hole 330 will cause the helical insert 334 to expand, and lock the anti-rotation of the inserted bolt by bearing against the insert body 214.

FIG. 3 shows two cross-sectional views of the panel insert components along line 3-3 of FIG. 2. FIG. 3A is an exploded cross section. Panel insert 300 shows faceplate 322, plug body 314 and cup 316. A hole 330 is formed in the faceplate 322, and said opening continues into plug body at cavity 332. In a preferred embodiment the size of the hole 330 is slightly smaller that the relaxed diameter of helical insert 334, so that when the panel insert is assembled, the helical insert in trapped in cavity 332. As shown in FIG. 3A, the faceplate 322 may in an alternative embodiment be formed as a separate piece from plug body 314.

FIG. 38 shows a cross section with the components assembled into a panel insert. As shown panel insert 300 has faceplate 322 that will be exposed on the interior surface of a mounted panel, plug body 314 and cup 316. Hole 330 in the faceplate 322, continues into plug body at cavity 332, with the helical insert in trapped in cavity 332. Cup 316 is forced over the plug body 314, and may be crimped into position. The exterior surface of plug body 314 may be serrated, or diamond etched as at 340, and bear against the interior surface of the cup wall at 342.

Figure 4:
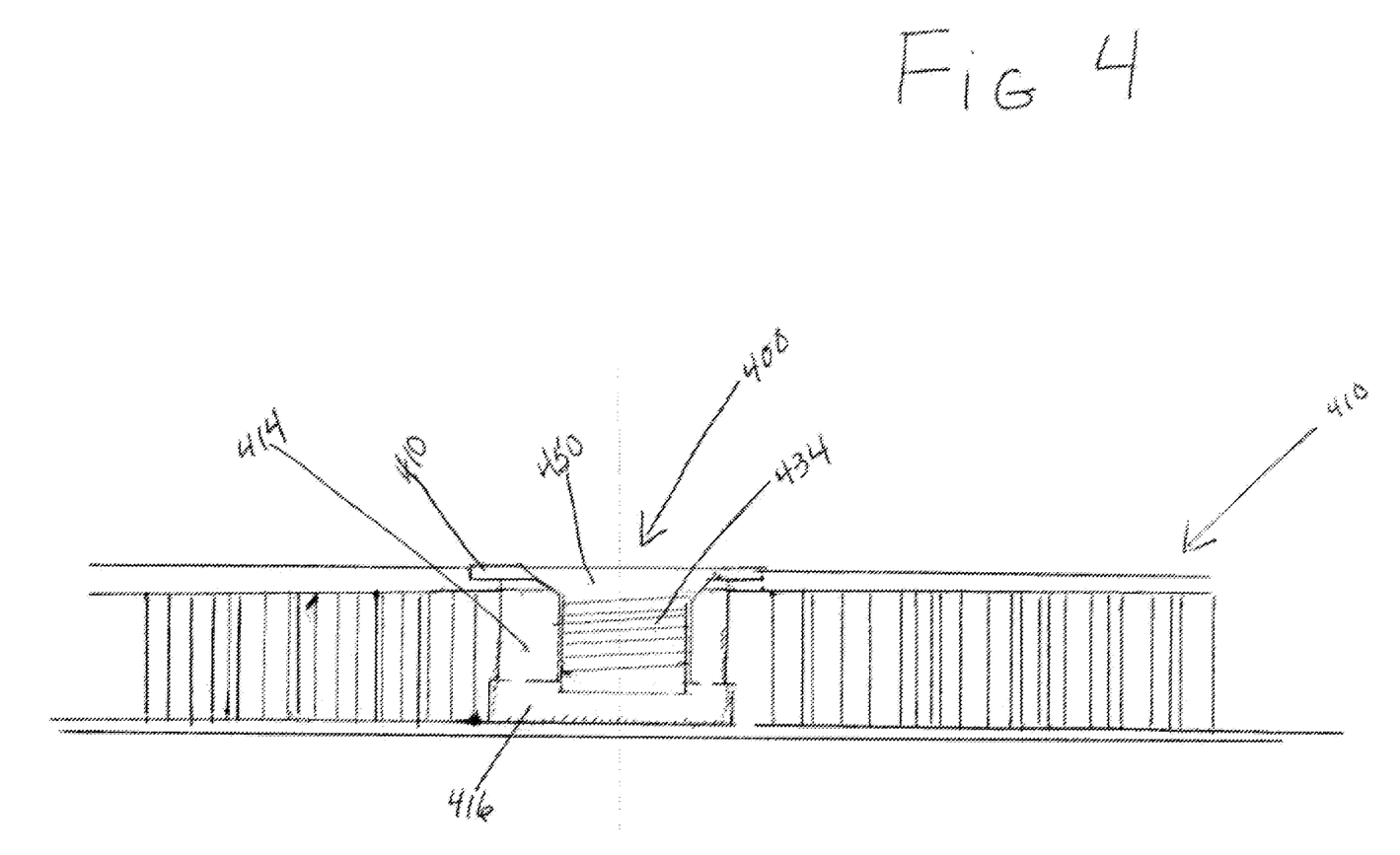
FIG. 4 shows a cross section of an assembled floating panel insert.

FIG. 4 shows a cross section of a panel insert 400 inserted into a void-core panel 410. As a screw is inserted into the assembled panel fastener, rotation of the screw engages the helical insert 434, and the insert against the inside walls of the plug body cavity 450.

The disclosed fastener provides for a strength increase by providing the sleeve, plug insertion to produce a two-piece housing and plug assembly that eliminates a common failure mode caused by unexpected tilting due to the short insert length on the existing similar fasteners version. The disclosed fastener system eliminates the most common assembly error encountered by manufacturers thus reducing cost resulting from damaged panels, scrap fasteners and longer build times due to error.

Figure 5:
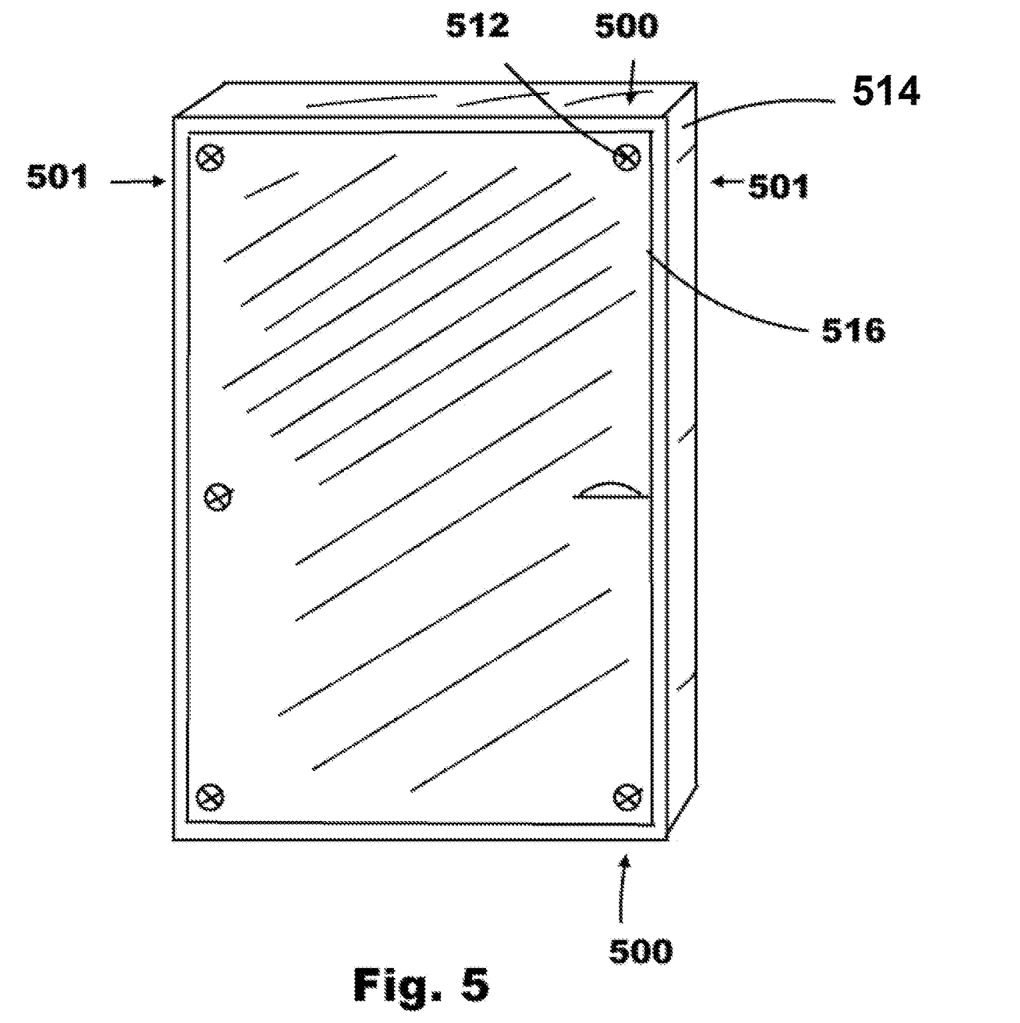
FIG. 5 shows a perspective view from the front of a ballistic-resistant panel attached to a door.

FIG. 5 shows a perspective view from the front of a ballistic-resistant panel attached to a door and also ballistic-resistant fasteners. The door (514) may be placed at the entrance of the pilot's cabin on an aircraft, to the bathrooms, to compartments for staff, or separating compartments between different sections of passenger cabins. Those skilled in the art of constructing mobile vehicles, including busses, trucks and railroad cars, and other facilities requiring high levels of security will recognize that the XPP inserts disclosed will be useful in a wide range of applications.

A ballistic-resistant panel (516) may be coupled to the door (514) by one or more XPP fastener assemblies (512 is labeled out of the 5 depicted ballistic-resistant fastener assemblies in FIG. 5). Five ballistic-resistant fastener assemblies (see 512) are depicted. An XPP fastener assembly may be a fastener that is described herein or elsewhere in the literature that is retrofitted with a ballistic-resistant shield, such as cylindrical shaped object which protects and surrounds all or some of the main shaft of a fastener. Some ballistic-resistant shields may encapsulate an entire fastener or a portion of the fastener, such as a cap or a head of a fastener. For example, a screw may be a fastener or may be part of a fastener, and the head of a screw may be fitted with a shield that is generally in the shape of the head of the screw and the shield may be made of ballistic-resistant material. In some embodiments, the shield has extra structures beyond the structure needed to generally conform to the shape of a fastener or a component of a fastener. For example, in some embodiments the shield may have flanges, caps, arms, plates or other elements that project from a shield. In some embodiments the fastener assemblies and the components of the fastener assemblies are made from ballistic-resistant material. Fasteners or components of ballistic-resistant assemblies may be a hybrid of ballistic-resistant material and material that is less ballistic-resistant. In some embodiments, a ballistic-resistant portion is threaded and may be coupled at the threads to a portion of a fastener assembly that is less ballistic-resistant.

In some embodiments the shield is indirectly or directly coupled to a fastener, and the fastener assembly may include one or more shields which protect the fastener and the fastener assembly.

In the most preferred embodiments the ballistic-resistant material is located at the outer edges or adjacent to the outer edges of a fastener or other components of a fastener assembly; but in some other embodiments the ballistic-resistant material is located in the core or interior of fasteners or other components of a fastener assembly.

Ballistic-resistant shields may include any material that has been used in a ballistic-resistant vest or panel, theorized as material for a ballistic-resistant vest, or has the strength similar or greater than Kevlar. Examples of ballistic-resistant material include Kevlar, Twaron, thus aramid fibers, Dyneema, graphene, carbon nanotube. Ballistic-resistant materials may be categorized into two grades: ballistic-resistant material that are not used in fasteners and ballistic-resistant material that are known to be used in fasteners.

Figure 6:
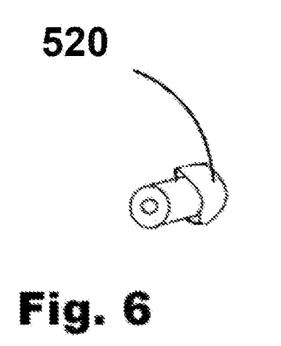
FIG. 6 shows a perspective view of a fastener.

FIG. 6 shows a fastener with a shield. Ballistic-resistant shield (520) may be oval shaped or any other type of shaped and may be attached to a fastener (521). Ballistic-resistant shield (520) may include multiple layers.

Figure 7:
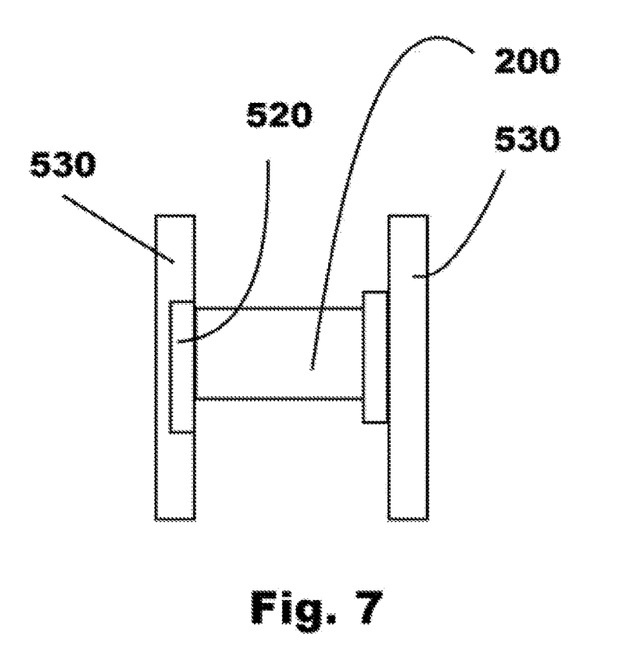
FIG. 7 shows a side elevation view of a panel insert flanked on each side by a shield.

FIG. 7 shows a cross-sectional view of a panel insert (200) flanked on each side by a shield. A different type of fastener may be substituted for panel insert (200). Shield (520) may be coupled to both a structural member (530) and a panel insert (200).

Figure 8:
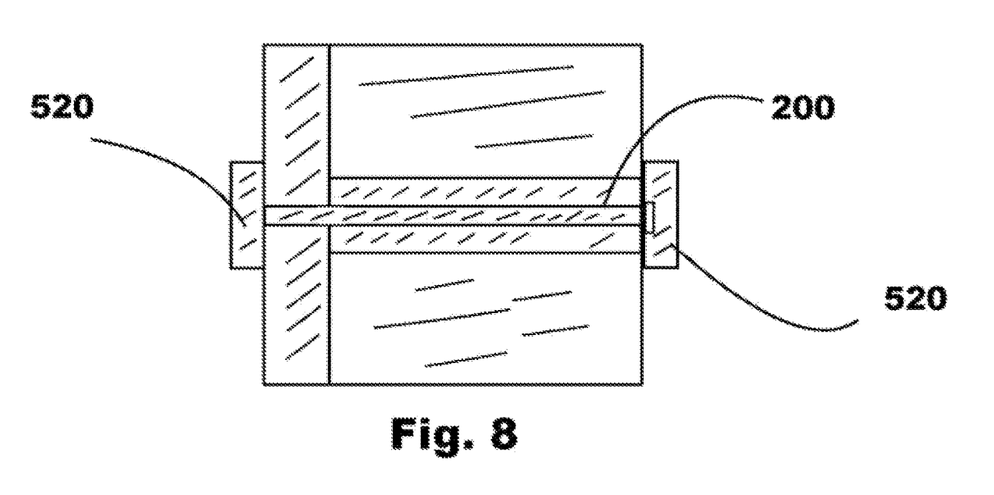
FIG. 8 shows a cross-sectional view of a fastener flanked by a shield.

FIG. 8 shows a panel insert (200) with an internal bolt flanked by a shield (520) on one end and a shield (520) on the opposite end.

Figure 9:
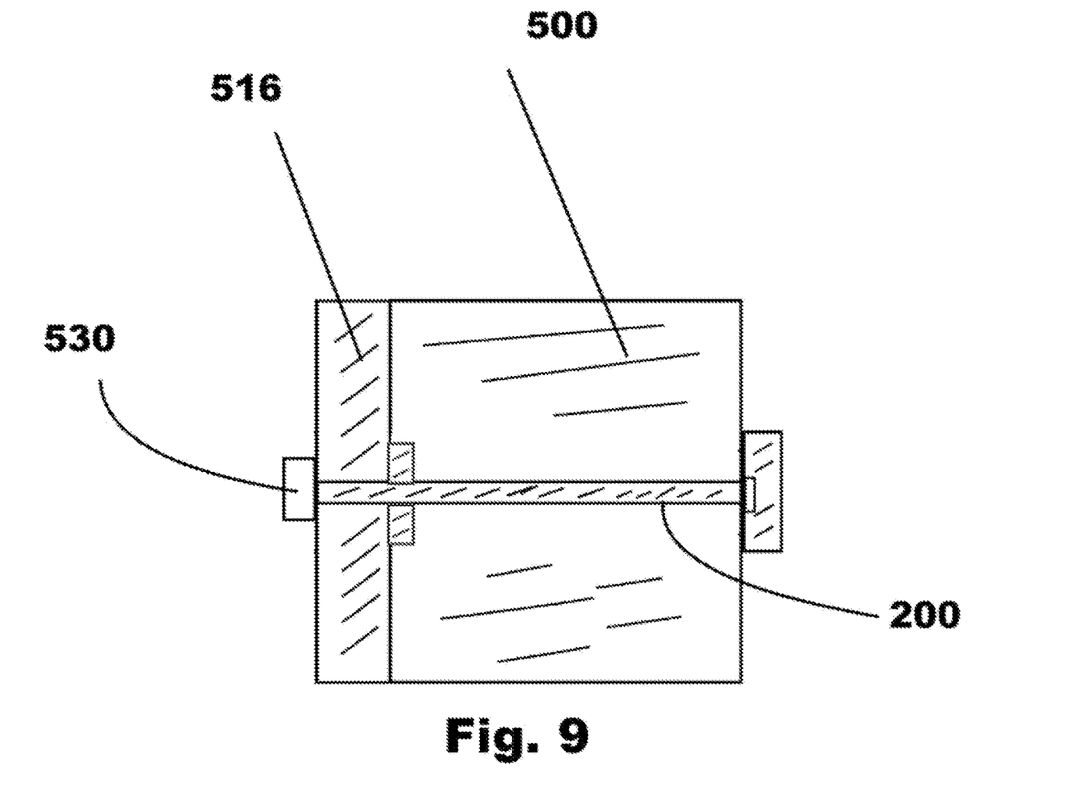
FIG. 9 shows a cross-sectional view of a fastener flanked by a pair of shields.

FIG. 9 shows a nut (530) coupled to a ballistic-resistant panel and a fastener (200). Fastener (200) penetrates both the ballistic-resistant panel (516) and a door (500). In the embodiment depicted in FIG. 9 a first shield (520) flanks the ballistic-resistant panel (516) and is inserted into a cavity of the door (500). A second shield (520) flanks the opposite end of the door (500) and also is coupled to the fastener. The fastener may have an optional nut.

Other embodiments include surrounding the fastener on four sides with four shield (520) or on three sides with three shields (520), five sides with five shields (520), or six sides with six shields (520). The fastener may be surrounded on anywhere between one side and six sides by any combination of zero to six shields (520) or shield assemblies, which is a shield with one or more other shields or components.

Additional benefits and features of the fastener system will be apparent to those skilled in the art.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

What is claimed:

1. A ballistic resistant fastener, comprising:
  a ballistic resistant face plate having a plate outer perimeter defining a plate outer perimeter dimension, a plate thickness, and a plate through-hole having a plate hole diameter, wherein the ballistic resistant face plate includes a plurality of layers with each layer including at least one of aramid synthetic fibers and carbon nanotubes, wherein the plate outer perimeter includes a plurality of notches extending inward from the plate outer perimeter toward the plate through-hole;
  a plug body having a body distal end, a body proximal end, a body length, a body exterior surface defining a body perimeter dimension, a threaded body bore extending from the body distal end toward the body proximal end and defining a bore diameter, wherein the body distal end is adjacent the ballistic resistant face plate and the plate outer perimeter dimension is greater than the body perimeter dimension, and the threaded body bore is aligned with the plate through-hole;
  a helical thread insert within the plug body and engaging the threaded body bore;
  a bolt extending through the plate through-hole and into the threaded body bore to engage the helical thread insert; and
  a bottom cup located at the body proximal end and having a cup sidewall attached to the body exterior surface, wherein the cup sidewall has a sidewall height that is greater than the plate thickness, and the cup sidewall has a sidewall thickness that is less than the plate thickness.

2. The ballistic resistant fastener of claim 1, wherein the plurality of notches includes at least two opposed notches located 180 degrees apart and a shortest distance between the opposed notches is less than the plate outer perimeter dimension.

3. The ballistic resistant fastener of claim 2, wherein each opposed notch has a notch width that is greater than the plate thickness.

4. The ballistic resistant fastener of claim 1, wherein the plate outer perimeter includes a plurality of serrations.

5. The ballistic resistant fastener of claim 4, wherein the plurality of serrations have an adjacent serration peak-to-peak separation distance that approximately equal to the plate thickness.

6. The ballistic resistant fastener of claim 1, wherein a portion of the body exterior surface includes a machined surface, and a portion of the cup sidewall covers a portion of the machined surface.

7. The ballistic resistant fastener of claim 1, wherein the body distal end has a body shoulder defining a shoulder diameter that is less than the plate hole diameter, and the body perimeter dimension is greater than the plate hole diameter.

8. A ballistic resistant fastener, comprising:
a ballistic resistant face plate having a plate outer perimeter defining a plate outer perimeter dimension, a plate thickness, and a plate through-hole having a plate hole diameter, wherein the ballistic resistant face plate includes a plurality of layers with each layer including at least one of aramid synthetic fibers and carbon nanotubes, and the plate outer perimeter includes a plurality of notches, extending inward from the plate outer perimeter toward the plate through-hole including at least two opposed notches located 180 degrees apart and a shortest distance between the opposed notches is less than the plate outer perimeter dimension, and each opposed notch has a notch width that is greater than the plate thickness;

a plug body having a body distal end, a body proximal end, a body length, a body exterior surface defining a body perimeter dimension, a threaded body bore extending from the body distal end toward the body proximal end and defining a bore diameter, wherein the body distal end is adjacent the ballistic resistant face plate and the plate outer perimeter dimension is greater than the body perimeter dimension, and the threaded body bore is aligned with the plate through-hole;

a helical thread insert within the plug body and engaging the threaded body bore;

a bolt extending through the plate through-hole and into the threaded body bore to engage the helical thread insert; and a bottom cup located at the body proximal end and having a cup sidewall attached to the body exterior surface, wherein the cup sidewall has a sidewall height that is greater than the plate thickness, and the cup sidewall has a sidewall thickness that is less than the plate thickness.

9. The ballistic resistant fastener of claim 8, wherein the plate outer perimeter includes a plurality of serrations.

10. The ballistic resistant fastener of claim 9, wherein the plurality of serrations have an adjacent serration peak-to-peak separation distance that approximately equal to the plate thickness.

11. The ballistic resistant fastener of claim 8, wherein a portion of the body exterior surface includes a machined surface, and a portion of the cup sidewall covers a portion of the machined surface.

12. The ballistic resistant fastener of claim 8, wherein the body distal end has a body shoulder defining a shoulder diameter that is less than the plate hole diameter, and the body perimeter dimension is greater than the plate hole diameter.

* * * * *